United States Patent
Suddreth et al.

(10) Patent No.: US 10,565,961 B1
(45) Date of Patent: Feb. 18, 2020

(54) DYNAMIC CONTRAST EQUALIZATION FOR SEE THROUGH DISPLAYS IN VARYING LIGHT CONDITIONS

(71) Applicant: HONEYWELL INTERNATIONAL INC., Morris Plains, NJ (US)

(72) Inventors: John G. Suddreth, Cave Creek, AZ (US); Jan Bilek, Moravia (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/044,555

(22) Filed: Jul. 25, 2018

(51) Int. Cl.
| | |
|---|---|
| G09G 5/10 | (2006.01) |
| G02B 27/01 | (2006.01) |
| H04N 5/57 | (2006.01) |
| H04N 9/77 | (2006.01) |
| H04N 13/183 | (2018.01) |
| G06T 5/00 | (2006.01) |

(52) U.S. Cl.
CPC ........... *G09G 5/10* (2013.01); *G02B 27/0101* (2013.01); *G02B 2027/014* (2013.01); *G02B 2027/0118* (2013.01); *G09G 2320/066* (2013.01); *G09G 2320/0686* (2013.01); *G09G 2340/12* (2013.01); *G09G 2360/144* (2013.01)

(58) Field of Classification Search
CPC combination set(s) only.
See application file for complete search history.

(56) References Cited

U.S. PATENT DOCUMENTS

| 5,841,507 A | 11/1998 | Barnes | |
|---|---|---|---|
| 6,456,738 B1 * | 9/2002 | Tsukasa | G06K 9/00442 382/175 |

(Continued)

FOREIGN PATENT DOCUMENTS

| EP | 2965143 A1 | 1/2016 |
|---|---|---|
| EP | 3230693 A1 | 10/2017 |

(Continued)

OTHER PUBLICATIONS

Sridharan, et al.; Color Correction for Optical See-Through Displays Using Display Color Profiles; Department of Computer Science, University of Manitoba, Winnipeg, Manitoba, Canada, School of Computing, University of Dundee, Dundee, Scotland.

(Continued)

*Primary Examiner* — Wesner Sajous
(74) *Attorney, Agent, or Firm* — Lorenz & Kopf, LLP (57) ABSTRACT

A processor-implemented method for dynamic contrast equalization for a see-through display subject to varying light conditions is provided. The method comprises: generating an intensity map for the field of view of the see-through display using a selected image portion of the retrieved image that is coextensive with the field of view of the see-through display; determining, using the intensity map, one or more sectors of the see-through display, on which a set of pixels corresponding to symbology in an overlay is to be displayed, that are in a high light intensity area; applying a filter to the see-through display at the one or more sectors of the see-through display to block a portion of light emanating from an external environment in the field of view of the see-through display; and displaying the overlay on the see-through display wherein the symbology is displayed over the one or more sectors.

20 Claims, 3 Drawing Sheets

(56) References Cited

U.S. PATENT DOCUMENTS

| | | | |
|---|---|---|---|
| 8,670,000 B2 | 3/2014 | Braun et al. | |
| 8,681,073 B1* | 3/2014 | Robbins | H04N 21/4318 |
| | | | 345/7 |
| 8,941,559 B2 | 1/2015 | Bar-Zeev et al. | |
| 9,069,163 B2 | 6/2015 | Schon | |
| 9,097,891 B2 | 8/2015 | Border et al. | |
| 9,415,745 B1 | 8/2016 | Clemen, Jr. et al. | |
| 9,566,946 B2 | 2/2017 | Loubiere | |
| 9,618,748 B2 | 4/2017 | Munger et al. | |
| 2010/0125812 A1* | 5/2010 | Hartman | G02B 27/01 |
| | | | 715/848 |
| 2017/0032571 A1* | 2/2017 | Mohideen | G06T 19/006 |
| 2017/0123492 A1* | 5/2017 | Marggraff | G06F 3/0236 |
| 2017/0307893 A1 | 10/2017 | Kooi et al. | |
| 2017/0330396 A1* | 11/2017 | Yehezkel | G07C 5/008 |
| 2018/0012417 A1* | 1/2018 | Haseltine | G06T 19/20 |
| 2018/0084232 A1* | 3/2018 | Belenkii | G02B 26/0833 |

FOREIGN PATENT DOCUMENTS

| | | |
|---|---|---|
| WO | 2011060525 A1 | 5/2011 |
| WO | 2015048911 A1 | 4/2015 |

OTHER PUBLICATIONS

Choi, et al.; Switchable Virtual, Augmented, and Mixed Reality through Optical Cloaking; The Institute of Optics, University of Rochester, Rochester, New York 14627, USA; Compiled Feb. 7, 2018.

\* cited by examiner

DYNAMIC CONTRAST EQUALIZATION FOR SEE THROUGH DISPLAYS IN VARYING LIGHT CONDITIONS

TECHNICAL FIELD

The technology described in this patent document relates generally to display systems and more particularly to dynamic display adjustment for see-through displays.

BACKGROUND

As see-through displays become more common, larger and used in dynamic lighting environments, symbology could be oversaturated in some lighting conditions and undersaturated in others, even on different portions of the same display.

Accordingly, it is desirable to provide systems and methods for adjusting the lighting conditions of a see-through display. Furthermore, other desirable features and characteristics of the present invention will become apparent from the subsequent detailed description of the invention and the appended claims, taken in conjunction with the accompanying drawings and the background of the invention.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A processor-implemented method for dynamic contrast equalization for a see-through display subject to varying light conditions is provided. In one embodiment, the method includes generating an intensity map for the field of view of the see-through display using a selected image portion of the retrieved image that is coextensive with the field of view of the see-through display; determining, using the intensity map, one or more sectors of the see-through display, on which a set of pixels corresponding to symbology in an overlay is to be displayed, that are in a high light intensity area; applying a filter to the see-through display at the one or more sectors of the see-through display to block a portion of light emanating from an external environment in the field of view of the see-through display; and displaying the overlay on the see-through display wherein the symbology is displayed over the one or more sectors of the see-through display.

A display adjustment module for a see-through display is provided. In one embodiment, the display adjustment module includes one or more processors configured by programming instructions on non-transient computer readable media. The display adjustment module is configured to: generate an intensity map for the field of view of the see-through display using a selected image portion of the retrieved image that is coextensive with the field of view of the see-through display; determine, using the intensity map, one or more sectors of the see-through display, on which a set of pixels corresponding to symbology in an overlay is to be displayed, that are in a high light intensity area; and apply a filter to the see-through display at the one or more sectors of the see-through display to block a portion of light emanating from an external environment in the field of view of the see-through display to allow the symbology to be displayed over the one or more light-filtered sectors of the see-through display.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Aspects of the present disclosure are best understood from the following detailed description when read with the accompanying figures, wherein like numerals denote like elements, and wherein.

DETAILED DESCRIPTION

The subject matter described herein discloses apparatus, systems, techniques and articles for a display adjustment system that is configured to perform pixel by pixel intensity modification. The following detailed description is merely exemplary in nature and is not intended to limit the invention or the application and uses of the invention. As used herein, the word "exemplary" means "serving as an example, instance, or illustration." Thus, any embodiment described herein as "exemplary" or "example" is not necessarily to be construed as preferred or advantageous over other embodiments. All embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, summary, or the following detailed description.

Figure 1A:
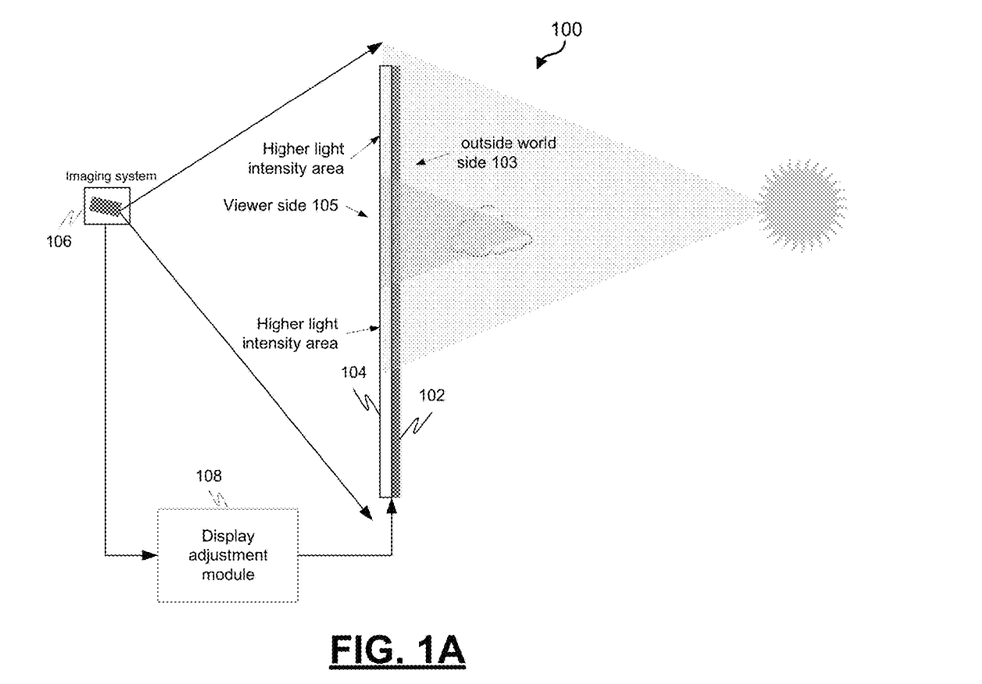
FIG. 1A is a diagram depicting an example operating environment in which a display adjustment system may be utilized, in accordance with some embodiments.

FIG. 1A is a diagram depicting an example operating environment in which a display adjustment system 100 may be utilized. The example display adjustment system 100 includes an addressable light-filtering system 102 that is coupled to a see-through display 104 (e.g., an electronic display that allows the user to see what is shown on the screen while still being able to see through it), an imaging system 106 (e.g., a visible light camera, infrared camera, and/or an enhanced vision system) capable of determining the lighting level received by the see-through display from an external environment, and a display adjustment module 108.

The example see-through display 104 may include display devices such as a head-mounted display (or helmet-mounted display), both abbreviated HMD, that allows symbology to be displayed on a screen through which a user views the outside world. The example see-through display 104 may also include a heads-up display (HUD), such as those used in aircraft and automobiles, or other screens that allow a user to see through them to view the outside world and that also allow overlays containing symbology to be displayed thereon.

The example addressable light-filtering system 102 is configured to be coupled to the example see-through display 104 and can be addressed on a pixel by pixel basis or a regional basis to selectively turn on pixels or regions at the addressed location to reduce the intensity of light from the outside world side 103 of the example see-through display 104 that passes through the see-through display at the addressed locations to the viewer side 105 of the example see-through display 104. The addressable light filtering system 102 may be directly coupled to a see-through display 104, for example, by being bonded to the see-through display 104. Alternatively, the addressable light filtering system 102 may be physically separated from a see-through display 104 but at the same time indirectly coupled to the see-through display 104 through filtering light that passes through the see-through display. For example, the addressable light filtering system 102 could be attached to a windshield of the vehicle, and the display device may be a physically distinct device such as a HUD or HMD. In this case, contrast enhancement using the example addressable light-filtering system 102 may have to be regional based on the location of the expected eye box. If eye/head tracking were employed to compute the intersecting pixels of the contrast enhancing pixels, the pupils and symbology, contrast enhancement using the example addressable light-filtering system 102 may be performed on a pixel by pixel basis.

The example addressable light-filtering system 102 may include an electrochromic device comprising an electrochromic coating that is applied to the surface of the example see-through display 104 (or another surface that is physically separate from the surface of the see-through display 104 such as a windshield), wherein the electrochromic coating is configured to reduce the optical transmission of light when activated and to allow the optical transmission of light when not activated. The electrochromic coating may be configured to operate in a binary manner (e.g., on/off) or may be configured to provide varying levels of shading. The example addressable light filtering system 102 may include other devices capable of being addressed on a pixel by pixel basis or regional basis and configured to reduce (e.g., in a binary or varying manner) the optical transmission of light when activated and to allow the optical transmission of light when not activated, such as a liquid crystal layer over a surface or nanocrystal-based adaptive shading such as near-infrared (NIR) spectrally selective plasmonic nanocrystals or thin films.

The example imaging system 106 may include a visible light camera, infrared camera, and/or an enhanced vision system. The example imaging system 106 is capable of capturing and creating an image of the lighting in a field of view of the see-through display. The captured image may be used directly as the image map. Additional processing of the captured image may be performed to more discretely define high intensity areas, or to provide upper or lower cut off levels. For example, areas with lighting below a lower intensity cutoff threshold may be deemed to not need light filtering.

The example display adjustment module 108 is configured to apply a filter at addressable locations on the see-through display to block at addressed locations a portion of light emanating from an external environment in the field of view of the see-through display. The example display adjustment module 108 is configured to apply a filter to increase contrast between symbology to be displayed and the background on which the symbology will be displayed. The example display adjustment module 108 is configured to apply a filter when the symbology is to be displayed in a high light intensity area and/or if a desire exists to highlight the symbology regardless of whether the symbology is to be displayed in a high light intensity area. When symbology is to be displayed in a high light intensity area, the example display adjustment module is configured to generate an intensity map for the field of view of the see-through display using a selected image portion of a retrieved image from an imaging source that is coextensive with the field of view of the see-through display; determine, using the intensity map, one or more sectors of the see-through display, on which a set of pixels corresponding to symbology in an overlay is to be displayed, that are in a high light intensity area; and apply a filter to the see-through display at the one or more sectors of the see-through display to block at the one or more sectors a portion of light emanating from an external environment in the field of view of the see-through display.

In operation, external factors such as direct sunlight and clouds may cause different levels of lighting to pass through the see-through display 104 at different sectors of the display. It may be more difficult for a viewer of the see-through display to discern symbology displayed on sectors of the see-through display experiencing higher intensity lighting (e.g., sectors experiencing direct sunlight). The example display adjustment module 108 is configured to create an intensity map for the see-through display using image data from an imaging device and determine, using the intensity map, whether symbology is to be displayed in the high light intensity sectors. If symbology is to be displayed in a high light intensity sector, the example adjustment module is configured to selectively apply addressable filters from the addressable light-filtering system 102 to reduce the lighting from the external environment at the sectors where the symbology is to be displayed. The example display adjustment module 108 is configured to address, on a pixel by pixel basis, certain addressable filters from the addressable light-filtering system 102 to reduce the lighting from the external environment at specific locations where the symbology is to be displayed. The example display adjustment module 108 is configured to reduce lighting at specific locations to highlight certain symbology and/or if the symbology is to be displayed in a high light intensity sector. The example display adjustment module 108 may also be used to address, on a pixel by pixel basis, certain addressable filters from the addressable light-filtering system 102 to reduce the lighting from the external environment at specific locations to adjust the overall contrast of the incoming visual information (e.g., contrast of the out-of-the window image) even when symbology is not added to the display.

Figure 1B:
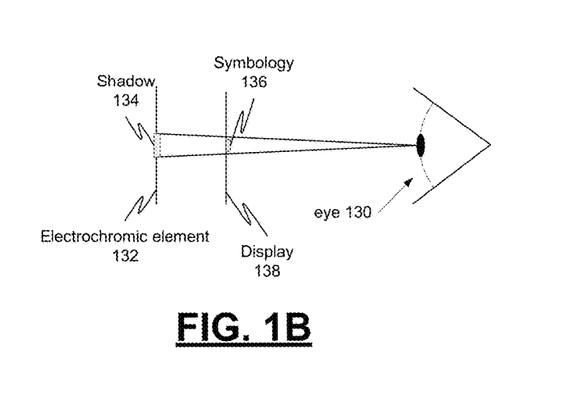
FIG. 1B is a diagram illustrating an example effect from the use of an addressable light-filtering system.

FIG. 1B is a diagram illustrating an example effect from the use of the addressable light-filtering system 102. In the example illustration, an electrochromic element 132 can be activated at certain pixel locations or regions to reduce the transmittance of light at the addressed pixels or regions to generate the appearance of a shadow 134 at those pixel locations or regions. When viewed by one or more eyes 130, symbology 136 displayed on a display 138 may appear to be displayed over the shadow 134. This can increase the contrast between the symbology 136 and the background lighting. When the electrochromic element 132 is not bonded to or directly incident with the display 138, the pixels of the shadow 134 may be larger than the display element (e.g., symbology 136). In the example of the electrochromic element 132 being attached to a windshield of a vehicle and the display 138 being a physically distinct device such as a HUD or HMD, the electrochromic element 132 may be controlled to cause the darkening of pixels directly behind the design eye position (e.g., darkening of primary pixels) and controlled to cause electrochromic pixels around the primary pixels to fade (e.g., block more light than the non-activated pixels but less light than the primary pixels) to account for head position changes.

Figure 1C:
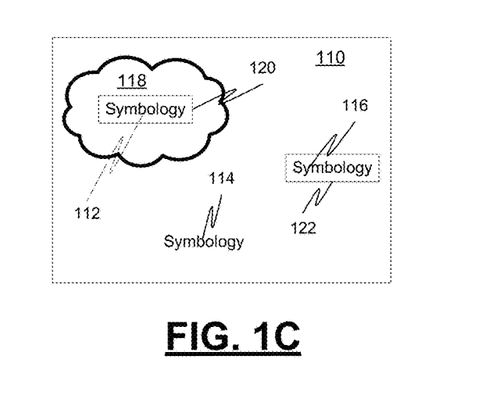
FIG. 1C is a diagram depicting an example display from an example see-through display system, in accordance with some embodiments.

FIG. 1C is a diagram depicting an example display 110 from an example see-through display system. Shown on the example display 110 are first symbology 112, second symbology 114, and third symbology 116. The first symbology 112 is displayed in a high light intensity area 118. Because the first symbology 112 is displayed in a high light intensity area 118, a display adjustment module activates addressable filters in the sector in which the symbology 112 is to be displayed to create a darker (or opaquer) background 120 on which the symbology will be displayed to create greater contrast between the background 120 and the symbology 112. The second symbology 114 is not displayed in a high light intensity area and therefore addressable filters in the sector in which the symbology 114 is to be displayed are not activated. The third symbology 116 is not displayed in a high light intensity area, but because the third symbology 116 has been pre-determined to be displayed on a lower light intensity background 122 to create greater contrast, the addressable filters in the sector in which the symbology is to be displayed are activated.

Figure 2:
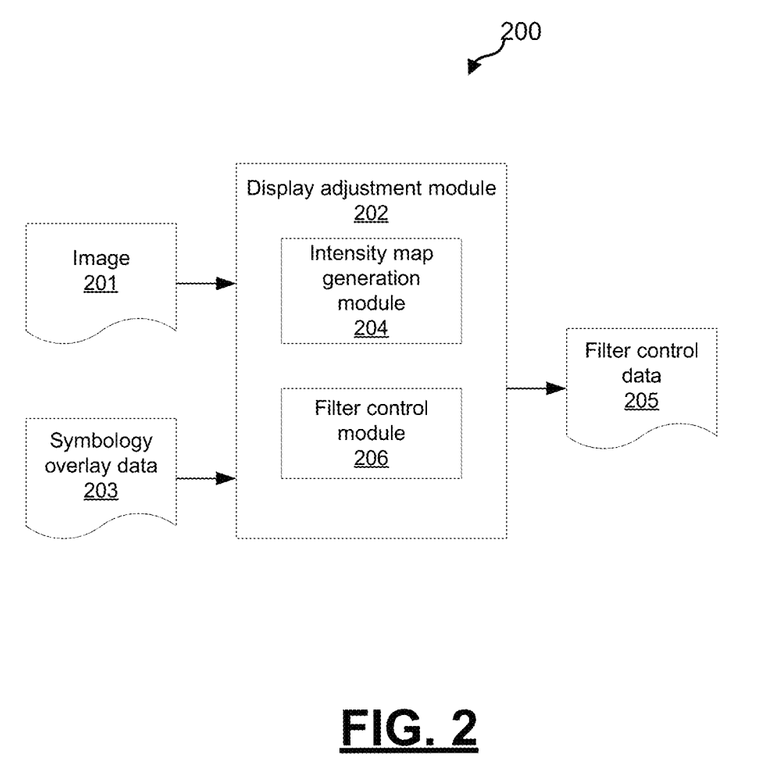
FIG. 2 is a block diagram depicting an example display adjustment module, in accordance with some embodiments.

FIG. 2 is a block diagram depicting an example display adjustment module 202. The example display adjustment module 202 is configured to apply a filter at addressable locations on a see-through display (or some other surface) to block a portion of light emanating from an external environment in the field of view of the see-through display. The example display adjustment module 202 is configured to apply a filter to increase contrast between symbology to be displayed and the background on which the symbology will be displayed. The example display adjustment module 202 is configured to apply a filter when the symbology is to be displayed in a high light intensity area or if the symbology has been predetermined to be highlighted. The example display adjustment module 202 is also configured to selectively apply a filter to adjust the overall contrast of the incoming visual information in locations where symbology may not be displayed. The example display adjustment module 202 includes an intensity map generation module 204 and a filter control module 206 and is implemented by a controller.

The example controller includes at least one processor and a computer-readable storage device or media. The processor may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller. The instructions may include one or more separate programs, each of which comprises an ordered listing of executable instructions for implementing logical functions. The instructions, when executed by the processor, receive and process signals, perform logic, calculations, methods and/or algorithms for controlling the display adjustment module 202.

The example intensity map generation module 204 is configured to generate an intensity map for the field of view of the see-through display using a selected image portion of a retrieved image 201, from an imaging system, that is coextensive with the field of view of the see-through display. The imaging system may include one or more of a visible light camera, an IR (infra-red) camera, or an enhanced vision system. The example display adjustment module 202 may designate a sector as being in a high light intensity area when the light intensity is above a pre-determined level. The example display adjustment module 202 may designate a sector as not being in a high light intensity area when the light intensity is below a pre-determined level.

The example filter control module 206 is configured to determine, using the intensity map, one or more sectors of the see-through display, on which a set of pixels corresponding to symbology in an overlay 203 is to be displayed, that are in a high light intensity area. To determine one or more sectors, the example module 206 is configured to: identify one or more high light intensity areas in the intensity map; map an overlay 203 to be displayed on the see-through display to the intensity map; identify a set of pixels corresponding to symbology in the overlay 203 that is mapped to the one or more high light intensity areas; and identify the one or more sectors on which the set of pixels are to be displayed.

The example filter control module 206 is further configured to apply a filter (e.g., by sending filter control data 205 to an addressable light-filtering system) to the see-through display at the one or more sectors of the see-through display (or some other surface) to block a portion of light emanating from an external environment in the field of view of the see-through display. As a result, when the overlay is displayed, the overlay is displayed on the see-through display over the one or more light-filtered sectors of the see-through display. To apply a filter, the module is configured to address and activate select areas of an addressable light-filtering system such as an electrochromic device. The electrochromic device may comprise an electrochromic coating applied to the surface of the see-through device, wherein the electrochromic coating is configured to reduce the optical transmission of light when activated.

The example filter control module 206 is further configured to identify, for each of the sectors, a zone of the see-through display that is slightly larger than the sector; and wherein to apply a filter to the see-through display, the module is configured to apply a filter to the see-through display at the one or more zones of the see-through display (or some other surface). As a result, when zones are identified, the symbology is displayed over the one or more zones of the see-through display such that a contrast halo is provided around the symbology.

The example filter control module 206 is further configured to identify a second set of pixels corresponding to pre-selected symbology in a second overlay to be displayed on the see-through display; determine a second sector of the see-through display on which the second set of pixels is to be displayed; and apply a second filter to the see-through display at the second sector of the see-through display (or some other surface) to block a portion of light emanating from the external environment in the field of view of the see-through display thereby allowing the display of the second overlay over the light-filtered second sector of the see-through display.

Figure 3:
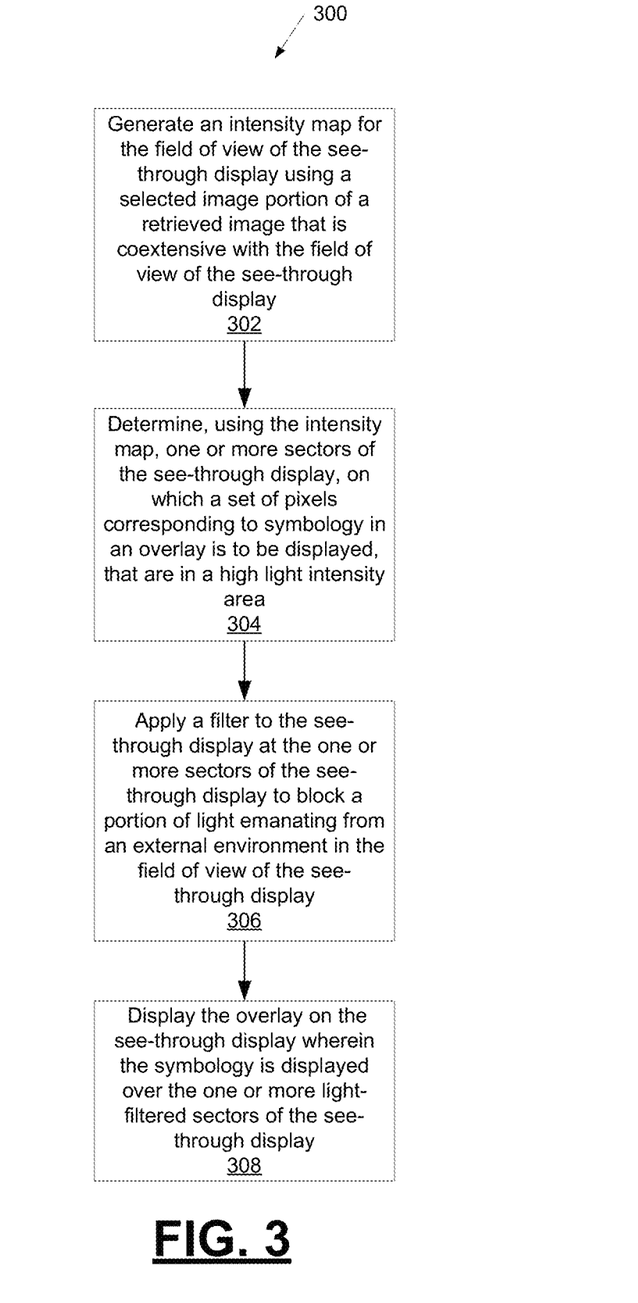
FIG. 3 is a process flow chart depicting an example process for dynamic contrast equalization for a see-through display subject to varying light conditions, in accordance with some embodiments.

FIG. 3 is a process flow chart depicting an example process 300 for dynamic contrast equalization for a see-through display subject to varying light conditions. The order of operation within the process is not limited to the sequential execution as illustrated in the figure, but may be performed in one or more varying orders as applicable and in accordance with the present disclosure.

The example process 300 includes generating an intensity map for the field of view of the see-through display using a selected image portion of a retrieved image that is coextensive with the field of view of the see-through display (operation 302). Generating an intensity map for the field of view of the see-through display may include: retrieving, from an imaging system, an image that encompasses the field of view of the see-through display; and generating an intensity map for the field of view of the see-through display using a selected image portion of the retrieved image that is coextensive with the field of view of the see-through display. The imaging system may include one or more of a visible light camera, and an IR sensor, and/or an enhanced vision system The example process 300 includes determining, using the intensity map, one or more sectors of the see-through display, on which a set of pixels corresponding to symbology in an overlay is to be displayed, that are in a high light intensity area (operation 304). Determining one or more sectors may include: identifying one or more high light intensity areas in the intensity map; mapping an overlay to be displayed on the see-through display to the intensity map; identifying a set of pixels corresponding to symbology in the overlay that is mapped to the one or more high light intensity areas; and identifying the one or more sectors on which the set of pixels is to be displayed. A sector may be designated as being in a high light intensity area when the light intensity is above a pre-determined level.

The example process 300 includes applying a filter to the see-through display at the one or more sectors of the see-through display to block a portion of light emanating from an external environment in the field of view of the see-through display (operation 306). Applying a filter may include addressing and activating select areas of an addressable light-filtering system such as an electrochromic device. The electrochromic device may comprise an electrochromic coating applied to the surface of the see-through device, wherein the electrochromic coating is configured to reduce the optical transmission of light when activated. Applying a filter may further comprise identifying, for each of the sectors, a zone of the see-through display that is slightly larger than the sector; and applying the filter to the see-through display at the one or more zones of the see-through display.

The example process 300 further includes displaying the overlay on the see-through display wherein the symbology is displayed over the one or more light-filtered sectors of the see-through display (operation 308). Displaying the overlay may include displaying the overlay on the see-through display wherein the symbology is displayed over the one or more zones of the see-through display such that a contrast halo is provided around the symbology.

Described herein are apparatus, systems, techniques and articles for dynamic contrast equalization for a see-through display subject to varying light conditions. A lower light intensity area, on which symbology can be overlaid, can be generated when the symbology is to be displayed in a high light intensity area and/or to highlight specific symbology.

In one embodiment, a processor-implemented method for dynamic contrast equalization for a see-through display subject to varying light conditions is provided. The method comprises: generating an intensity map for the field of view of the see-through display using a selected image portion of the retrieved image that is coextensive with the field of view of the see-through display; determining, using the intensity map, one or more sectors of the see-through display, on which a set of pixels corresponding to symbology in an overlay is to be displayed, that are in a high light intensity area; applying a filter to the see-through display at the one or more sectors of the see-through display to block a portion of light emanating from an external environment in the field of view of the see-through display; and displaying the overlay on the see-through display wherein the symbology is displayed over the one or more sectors of the see-through display.

In one embodiment, the imaging system includes one or more of a visible light camera, an IR sensor, or an enhanced vision system.

In one embodiment, determining one or more sectors comprises: identifying one or more high light intensity areas in the intensity map; mapping an overlay to be displayed on the see-through display to the intensity map; identifying a set of pixels corresponding to symbology in the overlay that is mapped to the one or more high light intensity areas; and identifying the one or more sectors on which the set of pixels are to be displayed.

In one embodiment, the method further comprises identifying, for each of the sectors, a zone of the see-through display that is slightly larger than the sector; and wherein applying a filter to the see-through display comprises applying a filter to the see-through display at the one or more zones of the see-through display.

In one embodiment, displaying the overlay comprises displaying the overlay on the see-through display wherein the symbology is displayed over the one or more zones of the see-through display such that a contrast halo is provided around the symbology.

In one embodiment, light intensity is above a pre-determined level at the one or more high light intensity areas.

In one embodiment, applying a filter comprises activating select areas of an addressable light-filtering device.

In one embodiment, the addressable light-filtering device comprises an electrochromic coating applied to the surface of the see-through device, wherein the electrochromic coating is configured to reduce the optical transmission of light when activated.

In one embodiment, generating an intensity map for the field of view of the see-through display comprises: retrieving, from an imaging system, an image that encompasses the field of view of the see-through display; and generating an intensity map for the field of view of the see-through display using a selected image portion of the retrieved image that is coextensive with the field of view of the see-through display.

In another embodiment, a display adjustment module for a see-through display is provided. The display adjustment module comprises one or more processors configured by programming instructions on non-transient computer readable media. The display adjustment module is configured to: generate an intensity map for the field of view of the see-through display using a selected image portion of the retrieved image that is coextensive with the field of view of the see-through display; determine, using the intensity map, one or more sectors of the see-through display, on which a set of pixels corresponding to symbology in an overlay is to be displayed, that are in a high light intensity area; and apply a filter to the see-through display at the one or more sectors of the see-through display to block a portion of light emanating from an external environment in the field of view of the see-through to allow the symbology to be displayed over the one or more light-filtered sectors of the see-through display.

In one embodiment, to generate an intensity map for the field of view of the see-through display, the module is further configured to: retrieve, from an imaging system, an image that encompasses the field of view of the see-through display; and generate an intensity map for the field of view of the see-through display using a selected image portion of the retrieved image that is coextensive with the field of view of the see-through display.

In one embodiment, the imaging system includes one or more of a visible light camera, an IR sensor, or an enhanced vision system.

In one embodiment, to determine one or more sectors, the module is configured to: identify one or more high light intensity areas in the intensity map; map an overlay to be displayed on the see-through display to the intensity map; identify a set of pixels corresponding to symbology in the overlay that is mapped to the one or more high light intensity areas; and identify the one or more sectors on which the set of pixels are to be displayed.

In one embodiment, the display adjustment module is further configured to identify, for each of the sectors, a zone of the see-through display that is slightly larger than the sector; and wherein to apply a filter to the see-through display, the module is configured to apply a filter to the see-through display at the one or more zones of the see-through display.

In one embodiment, to display the overlay, the module is configured to display the overlay on the see-through display wherein the symbology is displayed over the one or more zones of the see-through display such that a contrast halo is provided around the symbology.

In one embodiment, light intensity is above a pre-determined level at the one or more high light intensity areas.

In one embodiment, to apply a filter, the module is configured to activate select areas of an addressable light-filtering device.

In one embodiment, the addressable light-filtering device comprises an electrochromic coating applied to the surface of the see-through device, wherein the electrochromic coating is configured to reduce the optical transmission of light when activated.

In one embodiment, the display adjustment module is further configured to: identify a second set of pixels corresponding to pre-selected symbology in a second overlay to be displayed on the see-through display; determine a second sector of the see-through display on which the second set of pixels is to be displayed; apply a second filter to the see-through display at the second sector of the see-through display to block a portion of light emanating from the external environment in the field of view of the see-through display; and display the second overlay over the second sector of the see-through display.

In another embodiment, a processor-implemented method for displaying symbology on a see-through display is provided. The method comprises: identifying a set of pixels corresponding to pre-selected symbology in an overlay to be displayed on the see-through display; determining one or more sectors of the see-through display on which the set of pixels are to be displayed; identifying, for each of the sectors, a zone of the see-through display that is slightly larger than the sector; applying a filter to the see-through display at the one or more zones of the see-through display to block a portion of light emanating from an external environment in the field of view of the see-through display; and displaying the overlay on the see-through display wherein the symbology is displayed over the one or more zones of the see-through display such that a contrast halo is provided around the symbology.

In another embodiment, a processor-implemented method for dynamic contrast equalization for a see-through display subject to varying light conditions is provided. The method comprises: retrieving, from an imaging system, an image that encompasses the field of view of the see-through display, wherein the imaging system includes one or more of a visible light camera, an IR sensor, or an enhanced vision system; generating an intensity map for the field of view of the see-through display using a selected image portion of the retrieved image that is coextensive with the field of view of the see-through display; identifying one or more high light intensity areas in the intensity map wherein light intensity is above a pre-determined level; determining a set of pixels corresponding to symbology in an overlay to be displayed on the see-through display that correspond to the high light intensity areas; determining one or more sectors of the see-through display on which the set of pixels are to be displayed; identifying, for each of the sectors, a zone of the see-through display that is slightly larger than the sector; applying a filter to the see-through display at the one or more zones of the see-through display to block a portion of light emanating from an external environment in the field of view of the see-through display; and displaying the overlay on the see-through display wherein the symbology is displayed over the one or more zones of the see-through display such that a contrast halo is provided around the symbology.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention if such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A processor-implemented method for dynamic contrast equalization for a see-through display subject to varying light conditions, the method comprising:
   generating an intensity map for the field of view of the see-through display using a selected image portion of a retrieved image that is coextensive with the field of view of the see-through display;
   determining, using the intensity map, one or more sectors of the see-through display, on which a set of pixels corresponding to symbology in an overlay is to be displayed, that are in a high light intensity area;
   applying a filter to the see-through display at the one or more sectors of the see-through display to block a portion of light emanating from an external environment in the field of view of the see-through display; and
   displaying the overlay on the see-through display wherein the symbology is displayed over the one or more sectors of the see-through display.

2. The method of claim 1, wherein generating an intensity map for the field of view of the see-through display comprises:
   retrieving, from an imaging system, an image that encompasses the field of view of the see-through display; and
   generating an intensity map for the field of view of the see-through display using a selected image portion of the retrieved image that is coextensive with the field of view of the see-through display.

3. The method of claim 2, wherein the imaging system includes one or more of a visible light camera, an IR sensor, or an enhanced vision system.

4. The method of claim 1, wherein determining one or more sectors comprises:
   identifying one or more high light intensity areas in the intensity map;
   mapping an overlay to be displayed on the see-through display to the intensity map;
   identifying a set of pixels corresponding to symbology in the overlay that is mapped to the one or more high light intensity areas; and
   identifying the one or more sectors on which the set of pixels are to be displayed.

5. The method of claim 1, further comprising identifying, for each of the sectors, a zone of the see-through display that is slightly larger than the sector; and wherein applying a filter to the see-through display comprises applying a filter to the see-through display at the one or more zones of the see-through display.

6. The method of claim 5, wherein displaying the overlay comprises displaying the overlay on the see-through display wherein the symbology is displayed over the one or more zones of the see-through display such that a contrast halo is provided around the symbology.

7. The method of claim 1, wherein light intensity is above a pre-determined level at the one or more high light intensity areas.

8. The method of claim 1, wherein applying a filter comprises activating select areas of an addressable light-filtering device.

9. The method of claim 1, wherein the addressable light-filtering device comprises an electrochromic coating applied to the surface of the see-through device, wherein the electrochromic coating is configured to reduce the optical transmission of light when activated.

10. A display adjustment module for a see-through display comprising one or more processors configured by programming instructions on non-transient computer readable media, the display adjustment module configured to:
generate an intensity map for the field of view of the see-through display using a selected image portion of a retrieved image that is coextensive with the field of view of the see-through display;
determine, using the intensity map, one or more sectors of the see-through display, on which a set of pixels corresponding to symbology in an overlay is to be displayed, that are in a high light intensity area; and
apply a filter to the see-through display at the one or more sectors of the see-through display to block a portion of light emanating from an external environment in the field of view of the see-through display to allow the symbology to be displayed over the one or more light-filtered sectors of the see-through display.

11. The display adjustment module of claim 10, wherein to generate an intensity map for the field of view of the see-through display, the module is further configured to:
retrieve, from an imaging system, an image that encompasses the field of view of the see-through display; and
generate an intensity map for the field of view of the see-through display using a selected image portion of the retrieved image that is coextensive with the field of view of the see-through display.

12. The display adjustment module of claim 11, wherein the imaging system includes one or more of a visible light camera, an IR sensor, or an enhanced vision system.

13. The display adjustment module of claim 10, wherein to determine one or more sectors, the module is configured to:
identify one or more high light intensity areas in the intensity map;
map an overlay to be displayed on the see-through display to the intensity map;
identify a set of pixels corresponding to symbology in the overlay that is mapped to the one or more high light intensity areas; and
identify the one or more sectors on which the set of pixels are to be displayed.

14. The display adjustment module of claim 10, further configured to identify, for each of the sectors, a zone of the see-through display that is slightly larger than the sector; and wherein to apply a filter to the see-through display, the module is configured to apply a filter to the see-through display at the one or more zones of the see-through display.

15. The display adjustment module of claim 14, wherein to display the overlay, the module is configured to display the overlay on the see-through display wherein the symbology is displayed over the one or more zones of the see-through display such that a contrast halo is provided around the symbology.

16. The display adjustment module of claim 10, wherein light intensity is above a pre-determined level at the one or more high light intensity areas.

17. The display adjustment module of claim 10, wherein to apply a filter, the module is configured to activate select areas of an addressable light-filtering device.

18. The display adjustment module of claim 10, wherein the addressable light-filtering device comprises an electrochromic coating applied to the surface of the see-through device, wherein the electrochromic coating is configured to reduce the optical transmission of light when activated.

19. The display adjustment module of claim 10, further configured to:
identify a second set of pixels corresponding to pre-selected symbology in a second overlay to be displayed on the see-through display;
determine a second sector of the see-through display on which the second set of pixels is to be displayed;
apply a second filter to the see-through display at the second sector of the see-through display to block a portion of light emanating from the external environment in the field of view of the see-through display; and
display the second overlay over the second sector of the see-through display.

20. A processor-implemented method for displaying symbology on a see-through display, the method comprising:
identifying a set of pixels corresponding to pre-selected symbology in an overlay to be displayed on the see-through display;
determining one or more sectors of the see-through display on which the set of pixels are to be displayed;
identifying, for each of the sectors, a zone of the see-through display that is slightly larger than the sector;
applying a filter to the see-through display at the one or more zones of the see-through display to block a portion of light emanating from an external environment in the field of view of the see-through display; and
displaying the overlay on the see-through display wherein the symbology is displayed over the one or more zones of the see-through display such that a contrast halo is provided around the symbology.

\* \* \* \* \*